(12) United States Patent
Kleber

(10) Patent No.: US 8,484,828 B2
(45) Date of Patent: Jul. 16, 2013

(54) METHOD FOR FABRICATING A ROTOR FOR AN INDUCTION MOTOR

(75) Inventor: Richard M. Kleber, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 11 days.

(21) Appl. No.: 13/185,811

(22) Filed: Jul. 19, 2011

(65) Prior Publication Data
US 2013/0020899 A1   Jan. 24, 2013

(51) Int. Cl.
*H02K 15/02* (2006.01)
*H02K 15/10* (2006.01)

(52) U.S. Cl.
USPC .............................................. 29/598; 29/596

(58) Field of Classification Search
USPC ................. 29/508, 596, 597; 310/54, 156.34, 310/156.56, 211, 265
See application file for complete search history.

(56) References Cited

U.S. PATENT DOCUMENTS

| 4,064,410 A * | 12/1977 | Roach ............................ 310/211 |
| 4,644,210 A | 2/1987 | Meisner et al. |
| 4,970,424 A | 11/1990 | Nakamura et al. |
| 6,159,305 A | 12/2000 | Kliman et al. |
| 8,365,392 B2 * | 2/2013 | Lyons et al. ..................... 29/598 |

FOREIGN PATENT DOCUMENTS

DE     36 86 863 T2    6/1993

OTHER PUBLICATIONS

U.S. Appl. No. 12/691,217, Wang.
U.S. Appl. No. 12/954,115, Gerard.
U.S. Appl. No. 12/954,080, Gerard.
U.S. Appl. No. 12/872,036, Osborne.
U.S. Appl. No. 13/032,771, Wang.
U.S. Appl. No. 13/037,040, Kleber.
U.S. Appl. No. 13/033,905, Kleber.

* cited by examiner

*Primary Examiner* — Thiem Phan

(57) ABSTRACT

A rotor core of an induction motor fabricating method includes a cylindrically shaped steel laminate stack having a plurality of longitudinal grooves distributed around the periphery of the steel laminate stack. A plurality of conductor bars are each located in one of the plurality of longitudinal grooves and each includes a first end projecting from a first end of the steel laminate stack. A shorting end ring includes a plurality of grooves aligned with and mated to the first ends of the conductor bars. The shorting end ring is affixed to the rotor core assembly by a lock ring assembled when at a thermally expanded condition to the rotor core when at a thermally contracted condition.

12 Claims, 3 Drawing Sheets

METHOD FOR FABRICATING A ROTOR FOR AN INDUCTION MOTOR

TECHNICAL FIELD

This disclosure is related to rotors for induction motors.

BACKGROUND

The statements in this section merely provide background information related to the present disclosure. Accordingly, such statements are not intended to constitute an admission of prior art.

An electric-powered induction motor transforms electric power to mechanical torque by inducing rotating magnetic fields between a static element, i.e., a stator, and a rotatable element, i.e., a rotor. The rotating magnetic fields generate torque on a shaft coupled to the rotor through conductor bars. Known stators induce current flows through conductor bars on the rotor that are preferably parallel to an axis of rotation of the rotor.

A known rotor for an induction motor includes a stack of steel sheets (i.e. laminated steel stack) assembled onto a rotatable shaft, and a plurality of conductor bars fabricated from conductive material, e.g., copper or aluminum. The conductor bars are contained in conductor bar grooves axially defined at the periphery of the laminated steel stack and are preferably connected at both axial ends of the rotors using shorting end rings.

Known rotor fabrication methods include placing the laminated steel stack into a casting mold and introducing molten material into open spaces formed in the rotor and open spaces between the die cast mold and the laminated steel stack to form the shorting end rings and conductor bars. It is known that oxide inclusions and voids may be formed in the conductor bars and shorting end rings during mold filling of molten material and solidification. The molten material may cool and partially solidify during turbulent flow of the molten material into the plurality of conductor bar grooves due in part to exposure to surface areas of the conductor bar grooves. The partially solidified molten material may impede molten material flow and cause voids, oxide inclusions, and other discontinuities in the conductor bars and the shorting end rings.

Power density output from an electric induction motor correlates to quality of the conductor bars and mass bulk density of the individual conductor bars. It is known that voids formed in the conductor bars and the shorting end rings during fabrication reduce power density output of the electric induction motor. The presence of oxide occlusions and cracks due to hot tearing reduces the electric conductivity of the conductor bars and shorting end rings, thereby reducing the power density of the motor.

The use of copper material for conductor bars and/or shorting end rings may increase power density and heat transfer characteristics of an induction motor as compared to an induction motor using aluminum conductor bars and aluminum shorting end rings. Known use of copper material for conductor bars and shorting end rings increases manufacturing process times and complexity as compared to aluminum conductor bars. Known manufacturing processes for manufacturing conductor bars and shorting end rings include casting the conductor bars and shorting end rings in place around the laminate stack. Another common approach is to pre-manufacture the conductor bars and shorting end rings for assembling onto the laminate stack to be welded or brazed in place.

SUMMARY

A rotor core of an induction motor includes a cylindrically shaped steel laminate stack having a plurality of longitudinal grooves distributed around the periphery of the steel laminate stack. A plurality of conductor bars are each located in one of the plurality of longitudinal grooves and each includes a first end projecting from a first end of the steel laminate stack. A shorting end ring includes a plurality of grooves aligned with and mated to the first ends of the conductor bars. The shorting end ring is affixed to the rotor core assembly by a lock ring assembled when at a thermally expanded condition to the rotor core when at a thermally contracted condition.

BRIEF DESCRIPTION OF THE DRAWINGS

One or more embodiments will now be described, by way of example, with reference to the accompanying drawings, in which.

DETAILED DESCRIPTION

Figure 1:
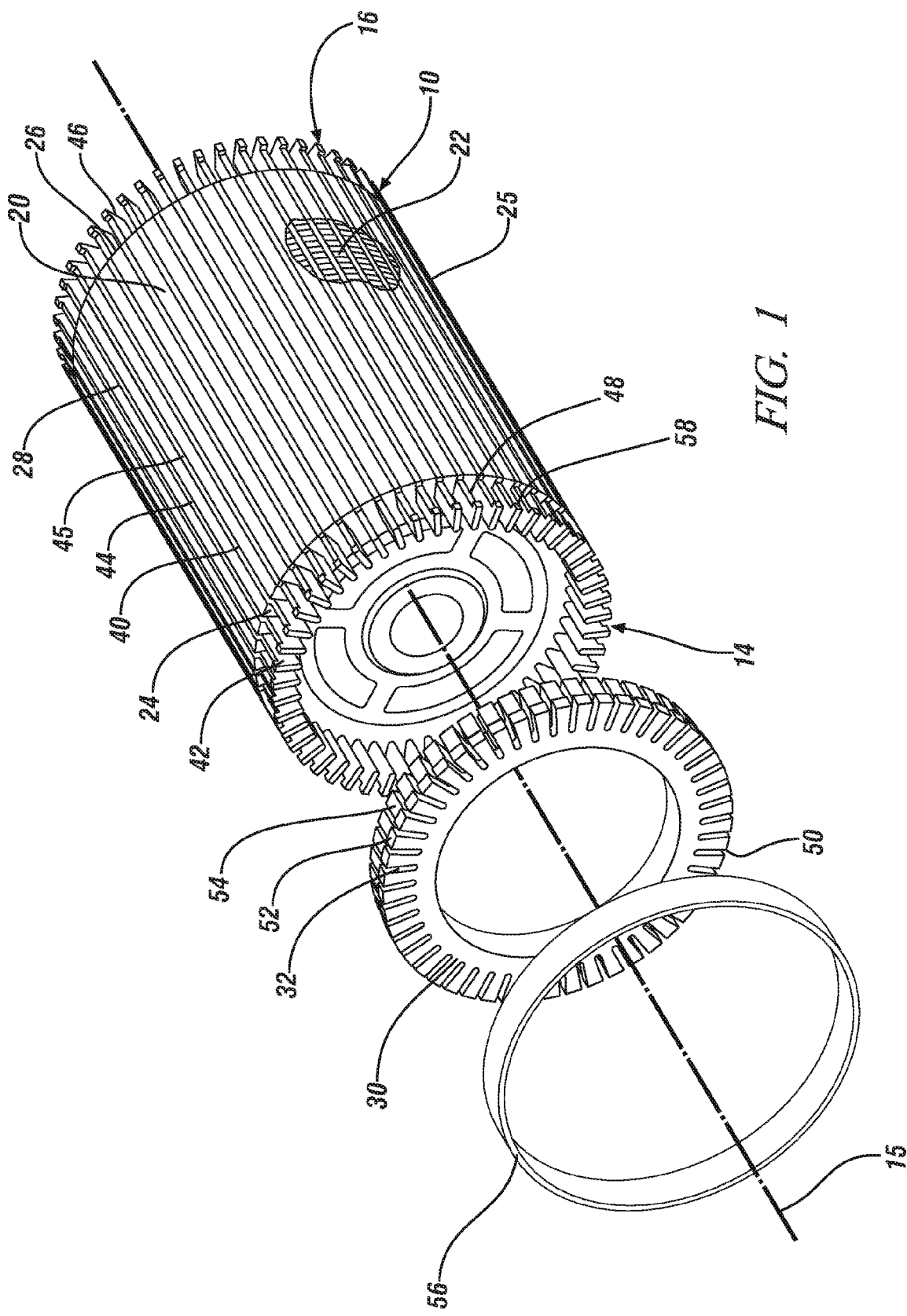
FIG. 1 is an isometric view illustrating a rotor core assembly for an induction motor, in accordance with the present disclosure.

Referring now to the drawings, wherein the showings are for the purpose of illustrating certain exemplary embodiments only and not for the purpose of limiting the same and like numbers are used to represent the same element throughout the drawings, FIG. 1 is an isometric drawing illustrating a rotor core assembly 10 for an induction motor. The induction motor may be any induction motor, including an induction motor for use on a powertrain system for a motor vehicle. The rotor core assembly 10 is fixedly attached to a rotor shaft centered upon an axis of rotation 15 using any suitable manufacturing method, such as, shrink fitting and lock-and-key torque fitting. It is appreciated that the rotor core assembly 10 may be assembled onto such a rotatable axle element subsequent to rotor core assembly. The rotor core assembly 10 and the rotor shaft share the same axis of rotation 15.

The rotor core assembly 10 includes a first end 14 and a second end 16. The rotor core assembly 10 is configured to be assembled into and rotate within a stator of an induction motor.

The rotor core assembly 10 includes an assembled cylindrically shaped rotor core 20 and a plurality of radially-oriented conductor bars 40 electrically connected to annular-shaped shorting end rings 30 that are assembled onto one or each of first and second ends 24 and 26, respectively, of the rotor core 20. The first end 24 of the rotor core 20 corresponds to the first end 14 of the rotor core assembly 10 and the second end 26 of the rotor core 20 corresponds to the second end 16 of the rotor core assembly 10. An axis of rotation of the rotor core 20 is coincident to the axis of rotation of the rotor core assembly 10 and the rotor shaft.

The rotor core 20 is fabricated from a plurality of thin laminate sheets 22 formed from ferric material, e.g., steel. In one embodiment the laminate sheets 22 are 0.33 mm (0.013 inches) thick. The laminate sheets 22 are stamped using a fine blanking process or similar manufacturing process and are preferably electrically insulated to minimize eddy currents.

Each laminate sheet 22 is a flat annular-shaped device and includes a plurality of radially-oriented apertures formed near an outer periphery thereof. When the laminate sheets 22 are assembled into the rotor core 20, the radially-oriented apertures are aligned to form grooves 28 that are parallel with the axis of rotation 15 and are radially-oriented near an outer periphery 25 of the rotor core 20. Alternatively, the grooves 28 may include an acute angle in relation to the axis of rotation 15. The grooves and the conductor bars herein will be discussed as longitudinally oriented with respect to the axis of rotation; however, this orientation is understood to include either an alignment that is parallel to the axis of rotation or at an acute angle from parallel with respect to the axis of rotation. The grooves 28 may have any suitable cross-sectional shape, and are substantially rectangular-shaped in one embodiment. The longitudinally-oriented grooves 28 are equally spaced around the periphery 25. The conductor bars 40 are each located or embedded within one of the grooves 28. As is appreciated, the laminate sheets 22 are assembled onto the axis of rotation 15 in a laminated fashion using any suitable fabricating method.

The conductor bars 40 are preferably fabricated from copper-based materials and are added to each of the grooves 28 by any suitable process, including, e.g., insertion or molding. Alternatively, the conductor bars 40 may be fabricated from aluminum-based or other electrically conductive material. The conductor bars 40 are disclosed to include features at each of a first end and a second end of the conductor bars 40 although only the first end will be discussed in detail. It will be appreciated that the conductor bars 40 could include the features described on the first end only with different features according to another method utilized at the second end.

Each conductor bar 40 includes the first portion 42, a main portion 44, and the second portion 46, and each has a peripheral edge 45. The first portion 42 extends longitudinally beyond the first end 24 of the rotor core 20. The second portion 46 extends longitudinally beyond the second end 26 of the rotor core 20. The main portion 44 is contained within the grooves 28 formed in the rotor core 20. The peripheral edge 45 of each conductor bar 40 projects through the grooves 28 on the periphery 25 along the main portion 44. The first and second portions 42, 46 include a recess 48 that starts at the first and second ends 24, 26 of the rotor core 20, respectively, that moves the peripheral edge 45 closer to the axis of rotation 15. The recess 48 ends in a tab 58 extending away from the axis of rotation 15.

Each of the annular-shaped shorting end rings 30 is preferably fabricated from copper-based materials and has a plurality of shorting end ring grooves 32 that correspond to the grooves 28 of the rotor core 20. Alternatively, the shorting end rings 30 may be fabricated from aluminum-based materials or other electrically conductive materials. The shorting end ring grooves 32 are designed to accommodate one of the first and second portions 42, 46 of the conductor bars 40 by slip fit. Each shorting end ring 30 includes a stepped side portion 50 with a first periphery 52 having a larger diameter than a second periphery 54. The first periphery 52 is sized to correspond with the tab 58 and the second periphery 54 is sized to correspond with the recess 48. The second periphery 54 is sized accept a lock ring 56 and to place an outer diameter of the lock ring 56 approximately equal to the rotor core 20 when fully assembled between the first periphery 52 and the first end 24.

Each shorting end ring 30 is assembled onto an end of the rotor core 20 by inserting one of the first and second portions 42, 46 of the conductor bars 40 into the shorting end ring grooves 32. The shorting end ring grooves 32 can be designed to have a slightly larger cross-section than the first and second portions 42, 46 of the conductor bars 40 for ease of assembly. The first and second portions 42, 46 of the conductor bars 40 may also be designed with a slight taper towards an outer end for ease of manufacturing and assembly. When the shorting end rings 30 are assembled onto the rotor core 20, the first and second portions 42, 46 of the conductor bars 40 preferably closely match the profile of the first and second periphery 52, 54 of the shorting end rings 30.

The lock ring 56 is sized fit around the second periphery 54 when assembled to the rotor core assembly 10. Assembly of the rotor core assembly 10 is assisted by using the principals of thermal expansion and contraction by temperature treating the components. The rotor core assembly 10 is partially assembled by assembling the rotor core 20, the conductor bars 40, and the shorting end rings 30. The partially assembled rotor core is temperature reduced, e.g., by refrigeration or cryogenics depending on the size reduction necessary, causing the partially assembled rotor core to contract. The lock ring 56 is temperature increased, e.g., by heating, causing the lock ring 56 to expand. Temperature treating the combination of the partially assembled rotor core contraction and the lock ring expansion provides the lock ring 56 clearance to slide over the first periphery 52 of the shorting end rings 30 and the tabs 58 of the conductor bars 40. The lock ring 56 can then be positioned over the second periphery 54 of the shorting end rings 30 and the recess of the conductor bars 40.

Subsequent to assembly of the lock ring to the end ring, the rotor core assembly 10 and the lock ring 56 are temperature equalized, that is, the rotor core assembly and the lock ring 56 are temperature equalized, i.e., brought to the same temperature, e.g., ambient temperature. The temperature of the partially assembled rotor core is increased causing the partially assembled rotor core to expand and the lock ring 56 is temperature decreased causing the lock ring 56 to contract. The temperature equalization can be accelerated and naturalized. Accelerated temperature equalization occurs by heating the rotor core assembly and/or cooling the lock ring 56 at rates faster than temperature equalization at ambient temperature. Naturalized temperature equalization occurs by temperature equalization at or near ambient temperature. The combination of the rotor core assembly expansion and the lock ring 56 contraction results in an interference fit and interlocking the lock ring 56 to the second periphery 54 of the conductor bars 40 and shorting end rings 30 creating the rotor core assembly 10.

Figure 2:
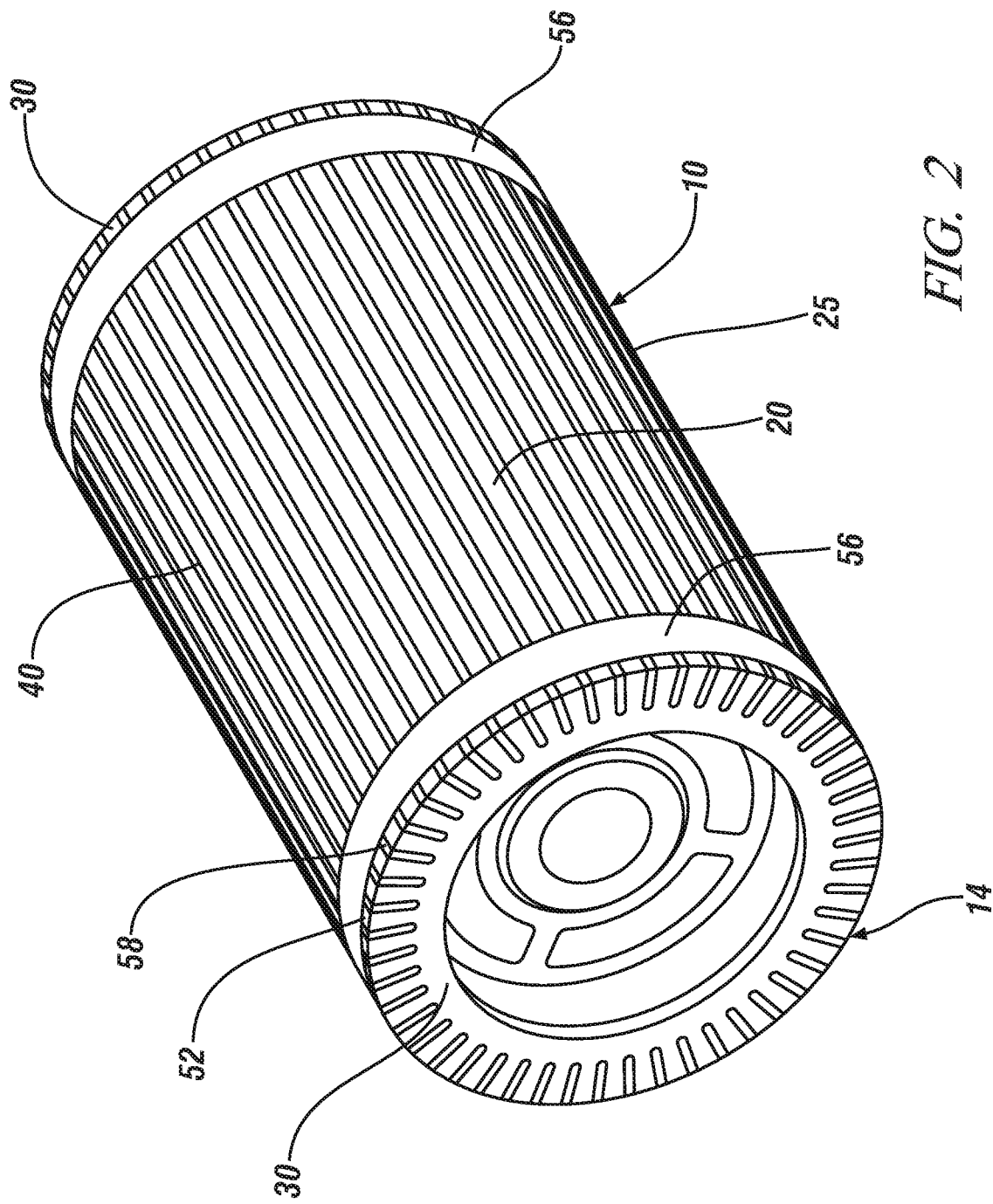
FIG. 2 illustrates an isometric view of a rotor core assembly for an induction motor fully assembled, in accordance with the present disclosure.

FIG. 2 illustrates an isometric view of a rotor core assembly 10 for an induction motor fully assembled. The lock ring 56 is positioned over the second periphery 54 of the conductor bars 40 and shorting end rings 30 after the lock ring 56 is thermally expanded and the partial rotor core assembly is thermally contracted. The lock ring 56 in the final assembly is approximately the same size diameter as the outer periphery 25 of the rotor core assembly 20 when near similar temperatures. It will be recognize that the first periphery 52 of the shorting end rings 30 and the height of the tabs 58 of the conductor bars 40 are depicted as the same thickness of the rotor core 20 although a smaller size may be used. For example, the first periphery 52 the height of the tabs 58 can be designed as a partial thickness of the lock ring 56 to secure the lock ring 56 about the second periphery 54.

Figure 3:
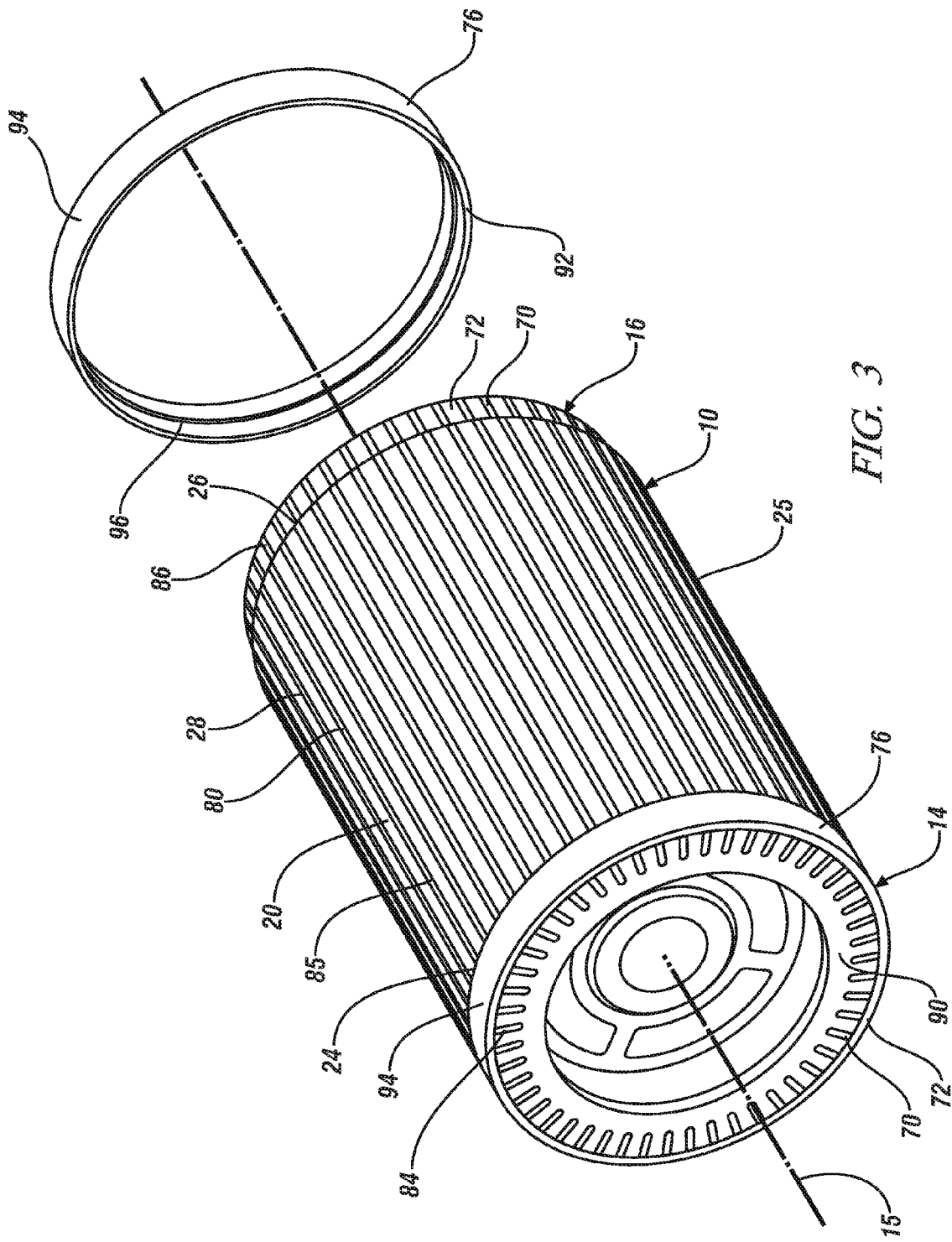
FIG. 3 illustrates an isometric view of another embodiment the rotor core assembly for an induction motor fully assembled, in accordance with the present disclosure.

FIG. 3 illustrates an isometric view of another embodiment the rotor core assembly 10 for an induction motor. The rotor core assembly 10 includes the rotor core 20 and a plurality of radially-oriented conductor bars 80 electrically connected to annular-shaped shorting end rings 90 that are assembled on to one or each of first and second ends 14, 16, respectively, of the rotor core assembly 10. The rotor core 20 is fabricated as above with a plurality of conductor bars 80 located or embedded within a like number of grooves 28.

The conductor bars 80 are designed with a peripheral edge 85 and first and second portions 84, 86 extending longitudinally beyond the first and second ends 24, 26 of the rotor core 20. The first and second portions 84, 86 have a recess 70 that moves the peripheral edge 85 closer to the axis of rotation 15. The shorting end rings 90 are configured to accommodate the first and second portions 84, 86 of the conductor bars 80 by slip fit. Each shorting end ring 90 has a periphery 72 that corresponds to the recess 70 of the first and second portions 84, 86 of the conductor bars 80.

The lock ring 76 is sized to fit around the periphery 72 when assembled to the rotor core assembly 10. The lock ring 76 has an inner surface 92 and an opposing outer surface 94. The lock ring 76 and the partially assembled rotor core is temperature treated, i.e., the lock ring 76 is temperature increased and the partially assembled rotor core is temperature reduced. The lock ring 76 can then be slid over the periphery 72. Both the partially assembled rotor core and the lock ring 76 may be temperature equalized. The partially assembled rotor core expands and the lock ring 76 contracts resulting in an interference fit and interlocking the lock ring 76 to the periphery 74 of the partially assembled rotor core to create the rotor core assembly 10. The outer surface 94 of the lock ring 76 is approximately the same diameter as the surface of the outer periphery 25.

In one embodiment, the lock ring 76 includes at least one protrusion 96 that extends from the inner surface 92 of the lock ring 76 toward the axis of rotation 15. The protrusion 96 can be, for example, a ring or series of rings of material protruding around the circumference of the inner portion of the lock ring 76 or a series of shapes, e.g., dots, dashes, chevrons, and the like, that is capable of creating additional grip around the periphery 74 of the shorting end rings 90 and the recess 70 of the first and second portions 84, 86, of the conductor bars 80. The protrusion 96 can deform when being temperature equalized thereby embossing the conductor bars 80 and the shorting end rings 90 and can take up any residual space existing in the grooves 28. Additionally, the protrusion on the circumference of the inner surface 92 of the lock ring 76 can have a mating impression located on the periphery 74 of the shorting end rings 90 and the recess 70 of the first and second portions 84, 86. For example, a ring of protruding material around the circumference of the inner portion of the lock ring 76 can have a mating groove in which to engage when final assembly occurs.

It will be apparent that the protrusion 96 can be associated with the lock ring 56 or the lock ring 76. Additionally, the shorting end rings 90 can include a series of heat sinks to effectuate heat transfer during operation. Further, the rotor core assembly 10 can include application of a solder bath as is commonly known for increasing the electrical conductivity and structure of the rotor core assembly 10.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for fabricating a rotor core assembly for an induction motor, comprising:
   providing a partially assembled rotor core including a shorting end ring attached to the rotor core assembly comprising a steel laminate stack and a plurality of conductor bars, wherein the shorting end ring comprises a plurality of grooves receiving corresponding portions of the conductor bars extending from a first end of the steel laminate stack;
   thermally treating at least one of the partially assembled rotor core and a lock ring sufficiently such that the lock ring may be assembled over the shorting end ring; and
   installing the lock ring over the shorting end ring.

2. The method of claim 1, wherein thermally treating at least one of the partially assembled rotor core and a lock ring comprises thermally reducing the partially assembled rotor core.

3. The method of claim 1, wherein thermally treating at least one of the partially assembled rotor core and a lock ring comprises thermally expanding the lock ring.

4. The method of claim 1, wherein thermally treating at least one of the partially assembled rotor core and a lock ring comprises thermally reducing the partially assembled rotor core and thermally expanding the lock ring.

5. The method of claim 1, wherein the plurality of conductor bars and the shorting end ring comprise a respective plurality of radially extending tabs.

6. The method of claim 5, wherein the plurality of radially extending tabs comprise a radial height substantially equal to the lock ring thickness.

7. The method of claim 5, wherein the plurality of radially extending tabs comprise a radial height less than the lock ring thickness.

8. The method of claim 1, wherein the lock ring comprises an inner surface protrusion.

9. The method of claim 8, wherein the shorting end ring comprises an impression located on a periphery of the shorting end ring and mating to the inner surface protrusion of the lock ring.

10. Method of fabricating a rotor core assembly for an induction motor, comprising:
    mating a shorting end ring comprising a plurality of grooves corresponding in number and shape to a plurality of conductor bars extending from a steel laminate stack;
    thermally reducing the steel laminated stack, the plurality of conductor bars and the shorting end ring;
    thermally expanding a lock ring; and
    assembling the shorting end ring over the lock ring and allowing the steel laminated stack, the plurality of conductor bars, the shorting end ring, and the lock ring to become temperature equalized.

11. The method of claim 10, wherein the plurality of conductor bars and the shorting end ring comprise a respective plurality of radially extending tabs at least partially the height of a thickness of the lock ring.

12. The method of claim 10, wherein the lock ring comprises an inner surface protrusion mating to an impression located on a periphery of the shorting end ring.

* * * * *